(12) United States Patent
Wuerz

(10) Patent No.: US 8,832,715 B2
(45) Date of Patent: Sep. 9, 2014

(54) LIMITING EXECUTION OF EVENT-RESPONSES WITH USE OF POLICIES

(75) Inventor: Mary Alice Wuerz, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 80 days.

(21) Appl. No.: 13/433,719

(22) Filed: Mar. 29, 2012

(65) Prior Publication Data

US 2013/0263155 A1    Oct. 3, 2013

(51) Int. Cl.
*G06F 3/00*    (2006.01)
*G06F 9/54*    (2006.01)

(52) U.S. Cl.
CPC ...................................... *G06F 9/542* (2013.01)
USPC .......................................................... 719/318

(58) Field of Classification Search
CPC ........................................................ G06F 9/542
USPC .......................................................... 719/318
See application file for complete search history.

(56) References Cited

U.S. PATENT DOCUMENTS

| | | | | |
|---|---|---|---|---|
| 6,151,582 A * | 11/2000 | Huang et al. | ................. | 705/7.25 |
| 6,519,637 B1 * | 2/2003 | Arkeketa et al. | ............. | 709/223 |
| 7,844,688 B2 * | 11/2010 | Shamia et al. | ................ | 709/220 |
| 7,984,499 B2 * | 7/2011 | Kitani | ............................. | 726/19 |
| 2002/0124085 A1 * | 9/2002 | Matsuda et al. | ............. | 709/226 |

OTHER PUBLICATIONS

Jussara Almeida, Providing Differentiated Levels of Serice in Web Content Hosting, Mar. 1998.*

* cited by examiner

*Primary Examiner* — Lechi Truong
(74) *Attorney, Agent, or Firm* — James E. Goepel

(57) ABSTRACT

Policies, which specify event-responses for reacting to events, may be configured on host computer systems. An event-response may be executed when a particular event is detected on a host. The events may include a software change, a host machine processes change, a resources key change, and/or a critical failure. One or more event-responses may be defined for a policy. When an event is detected, the active policy is examined for event-responses corresponding to the event. The event-responses may also have defined a permitted number of executions. Thus, an event-response may be automatically executed only a permitted number of times. After the permitted number is reached, the event-response no longer executes in response to an event. The counters corresponding to event-responses may be reset when a new policy is activated.

18 Claims, 9 Drawing Sheets

LIMITING EXECUTION OF EVENT-RESPONSES WITH USE OF POLICIES

The instant disclosure relates to computer systems. More specifically, this disclosure relates to handling events occurring on computer systems.

BACKGROUND

Information technology systems are essential to any modern business. These systems have grown more and more complex. Today they can include distributed centers located anywhere from a few miles apart to those across the continent or in separate countries. Today, personal computers are common and many businesses employ multiple operating systems from various vendors. Often systems are dispersed in branch offices running critical applications or containing essential data.

Tools are available that integrate operational control of multiple heterogeneous mainframes and distributed systems. These systems include numerous components that are managed. An example of a software tool to manage distributed systems is a workload manager built around business rules, where business rules are also sometimes referred to as policies. Business rules may include the set of application processes used by a business, the relative priorities of the processes, the expected resource needs for each process at any point in time, and the desired performance target for each set of processes. A typical workload manager defines and applies policies. The division of the processes into different groups on the host is done separately from the definition of the policies. Workload groups are usually determined according to their differing requirements and importance to the business. After workload groups are determined, policies are defined. One group might do batch processing of payroll, the other updating a sales database, and another managing communications with customers via a website. With conventional workload managers, each policy is defined by choosing the workload groups that will be running during a range of time and specifying each workload group's resource/performance needs and relative priority during that time.

During different time periods, different policies may be enforced. For example, it might generally be expected that there are more customer communications during a certain period X, so the workload manager may direct more processing resources to customers and less to batch processing payroll during the period X. In another example, in the middle of night more resources might be directed to updating databases before employees come to work and use the processing resources for other needs. According to some conventional schemes, policy A might run eight am to five pm, and policy B may run from five pm to midnight, and so on. Typically, policies are set up in advance and are not changed without manual intervention.

Changes in the host-level environment may affect which set of policies a site wishes to apply. The time-of-day, day-of-week, or day-of-month when such a change occurs may also affect which policies are desired. In conventional systems, the only way to affect a change in the rules enforced by the workload manager is to have a human operator notice the occurrence of the host-level event signaling the change and to manually initiate a new policy. This also requires that the operator have sufficient knowledge of the various business priorities to be able to determine what new policy (i.e., "new set of business rules") is appropriate for the new conditions. For these and other reasons, improvements are desirable.

SUMMARY

In one aspect, a computer program product having a computer readable medium having computer program logic recorded thereon for managing a distributed computer system is disclosed. The computer program product includes code for detecting a host condition of the distributed computer system and code for taking action in the distributed computer system automatically in response to detecting the host condition.

In another aspect, a system for managing a distributed computing system is disclosed. The system includes a first functional unit that monitors the distributed computing system for at least one host-level event and a second functional unit that performs an action responsive to detection of the at least one host-level event.

Furthermore, a system for managing workloads of a distributed computer system is disclosed. The system includes means for monitoring operation of the distributed computer system for an occurrence of a host-level event and means for invoking an action in the distributed computer system when the host-level event is detected.

In yet another aspect, a computer implemented method for allocating processing resources in a distributed computing system is disclosed. The method includes monitoring the distributed computing system for a host-level event and applying an action to the distributed computing system when the host-level event is detected.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

According to various embodiments, in general policies can be changed based on triggers, automatically. In one example, there is a set of host-level events that a workload manager is programmed to recognize, e.g., software changes, host machine processes, changes in resources keys, critical failures, something not responding appropriately when a processor goes bad, and the like. In response to recognizing one or more of the host-level events, the workload manager changes policies, in at least one aspect, by directing groups to different resources.

Thus, in one example, when a processor goes bad, the workload manager moves some processes to another machine, which might have more or less resources to devote. In another example, when it is determined that a group of processes is not receiving appropriate processing power, processing capabilities are enhanced by bringing on another CPU or changing a clock time of a CPU. In other words, some embodiments include rules that are automatically triggered to account for different resource availabilities. In another aspect, a workload manager recognizes a host-level event and triggers an event response, which can include emailing people or otherwise notifying an operator of a change.

Current workload managers have limited capability to react to host-level events. For example, if customer traffic is instantaneously up, the workload manager will not, itself, activate an emergency resource key providing additional processing power. In conventional systems, the reasons for a policy change are 1) the policy ran to the end of its associated time-range, and 2) a manual policy switch was requested by an operator. In such conventional systems, policies are defined to be either automatic (in which case they have a relative priority and an associated date/time range in which they are to run), or manual-run-only (in which case they have no time range or priority and are only in effect if manually requested). On the other hand, various embodiments of the disclosure do react to host-level events and can determine that a present resource allocation is suboptimal and then trigger policies to improve the resource allocation.

Figure 1:
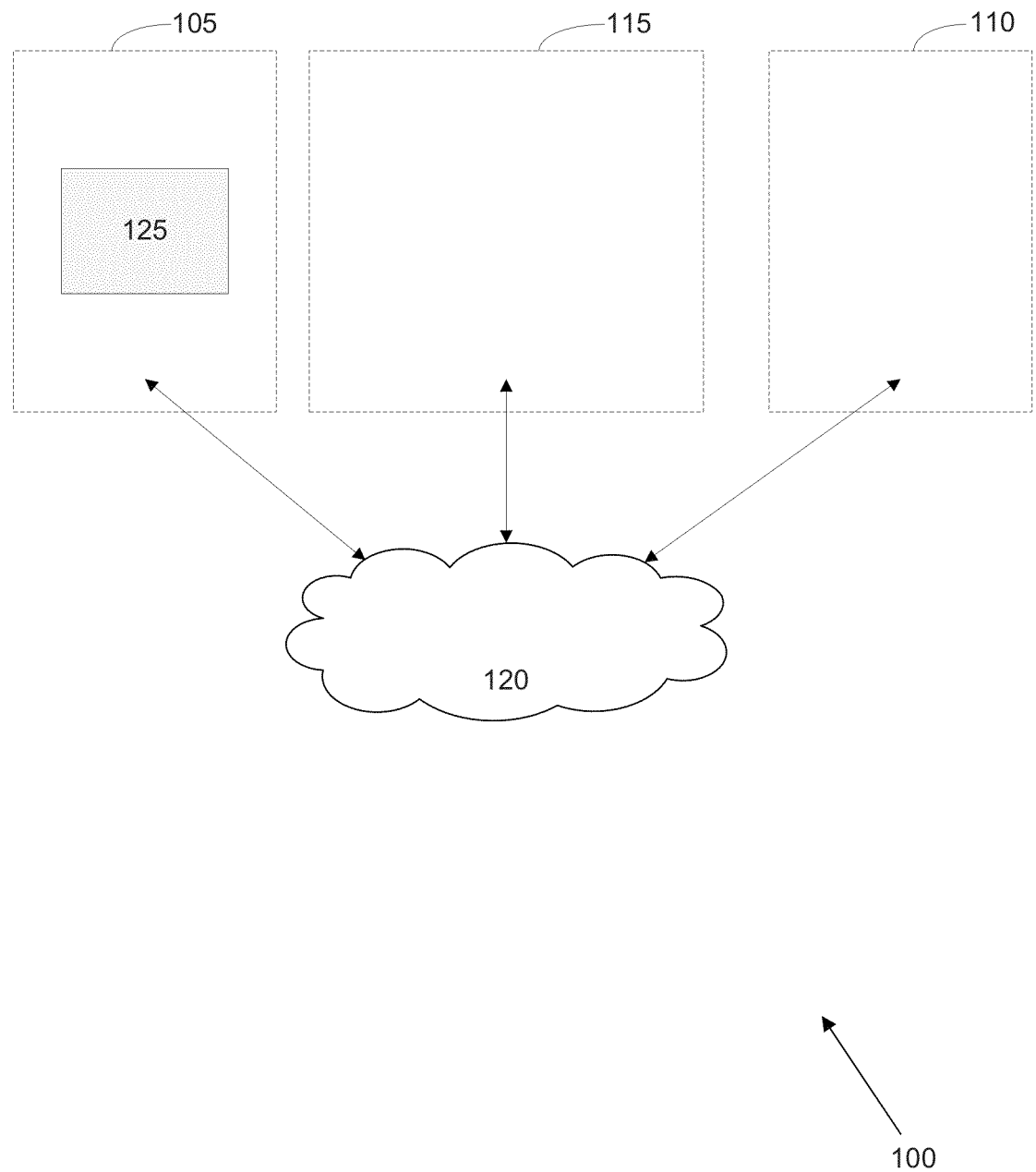
FIG. 1 is a block diagram of an operational system for managing a large distributed computing system adapted according to one example embodiment.

FIG. 1 is a block diagram of an operational system for managing a large distributed computing system 100 adapted according to one example embodiment. Preferably, the system 100 includes a server system 105, a managed system 110, and a client system 115, as is well known in the art. The server system 105, managed system 110, and the client system 115 preferably communicate with one another over a network 120, which can be any suitable network such as a LAN, WAN, or any other network.

In one possible embodiment, the server system 105 acts as a maintenance processing system and/or a utility monitoring processing system that functions to monitor the activities and health of the components, processes, and tasks executing within the managed system 110. The managed system 110 performs the processing desired by the operators of the managed system 110. Client systems, such as system 115, are processing systems utilized by operators of the managed system 110 to view operations, maintenance and health information regarding the components, processes and tasks in the managed system 110.

In the embodiment shown in FIG. 1, these three systems are shown to be separate processing systems. One of ordinary skill in the art will recognize that these systems may be implemented to operate on one as well as numerous hardware systems without deviating from the spirit and scope of the present invention as recited within the attached claims.

In various embodiments, the server system 105 runs a workload management program 125 that monitors the operation of the managed system 110 and automatically changes policies based on detected host-level events, as described in more detail below with respect to FIGS. 2A-6.

Figure 2A:
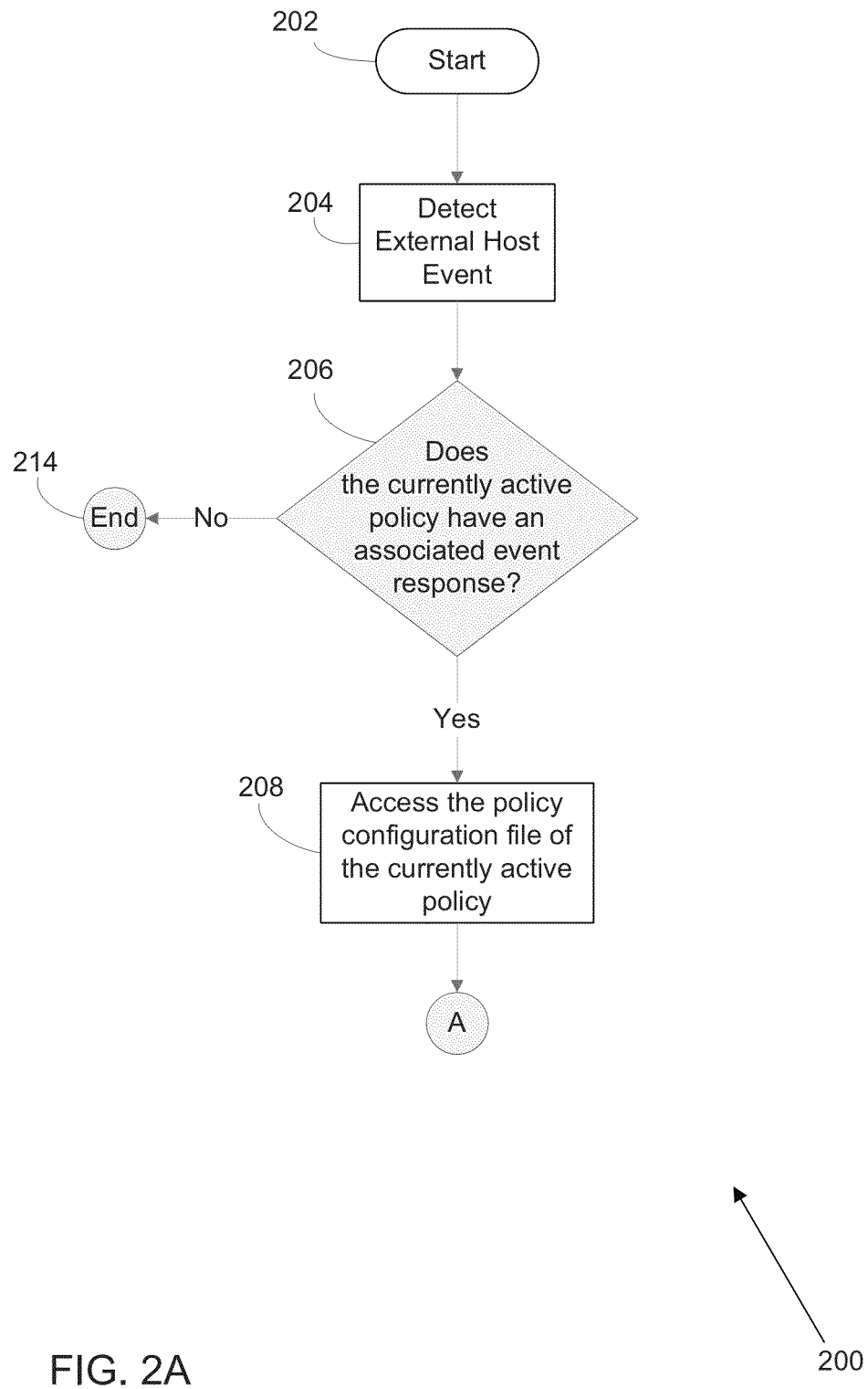
FIGS. 2A and 2B are an illustration of an exemplary operational flow for managing workloads, e.g., in the system of FIG. 1, adapted according to one embodiment.
Figure 2B:
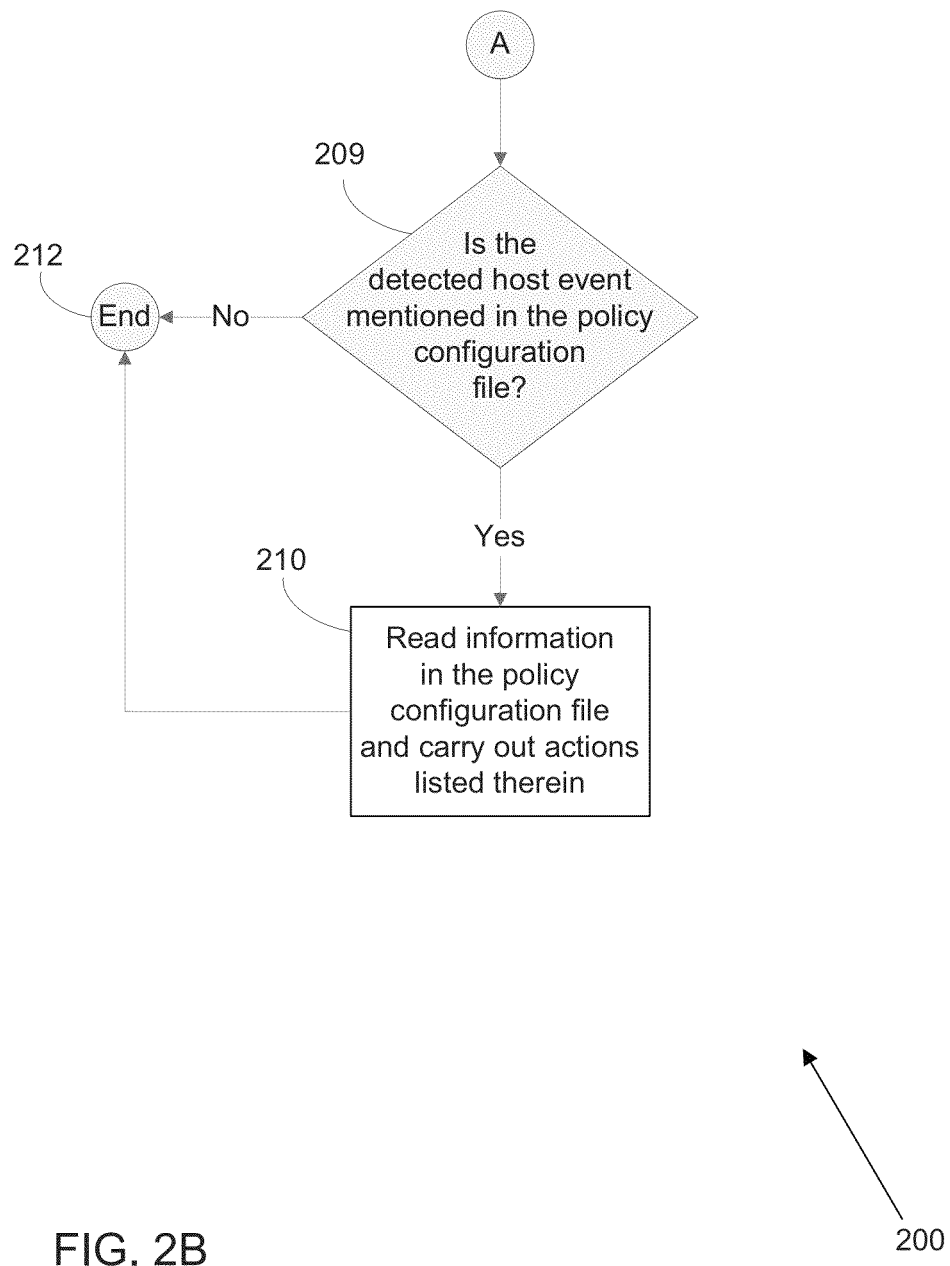

FIGS. 2A and 2B illustrate an exemplary operational flow 200 for managing workloads, e.g., in the system of FIG. 1, adapted according to one embodiment. Specifically, in some embodiments, the server system 105 runs a workload management program that performs the various actions described below. In the example of FIGS. 2A and 2B, the workload management program has access to a policy table, which lists various policies and associates various ones of the policies with one or more Event-Responses. An Event-Response in this example includes a change that triggers the response and a defined set of actions to be performed on the distributed computing system and it may include, without limitation, switching policies, changing operational parameters outside of a policy switch, etc.

The operational flow begins at block 202. At block 204, a host-level event is detected. Examples of host-level events include, but are not limited to, software changes, host machine processes, changes in resources keys, critical failures, failure of an operational part to perform appropriately, and the like. When a host-level event occurs, a call is initiated into a process, referred to herein for convenience as the Request_Event process. The Request_Event process accesses the policy table to check if the currently active policy has an associated Event-Response at block 206. If the currently active policy does not have an associated Event-Response, then the procedure will return with an informational return result and end at block 214.

If the currently active policy does have an associated Event-Response, the Request_Event process accesses the policy configuration file of the currently active policy, in which the Event-Response information is stored, at block 208. The Request_Event process performs a check to see if the specified host-level event is mentioned in the policy configuration file as part of the policy's Event-Response at block 209. If the specified host-level event is not mentioned in the policy configuration file as part of the policy's Event-Response, the Request_Event process returns with an informational result and ends at block 212.

If the specified host-level event is mentioned in the policy configuration file as part of the policy's Event-Response, the Request_Event process reads in the associated response information at block 210. The actions listed in the response information of the policy configuration file are then carried out.

In some instances, the actions specified in the configuration file include changing from the currently active policy to another policy. Additionally or alternatively, other actions may be taken, though such actions may not involve changing a policy. In any event, the actions undertaken at block 210 may include reallocating processing resources and/or enhancing processing resources. The actions may also include notifying operators of the event and the change and/or transmitting one or more pre-configured command-strings to the host system.

Various embodiments are not limited to the specific process illustrated in FIGS. 2A and 2B. Some embodiments may add, omit, rearrange, or modify one or more actions. For instance, in some embodiments, the Request_Event process sets a new flag in the policy table to indicate that the Event-Response has occurred after block 210. The flag permits the server to avoid carrying out the Response portion more than once in a policy run for those cases when the response does not involve switching policies.

Figure 3:
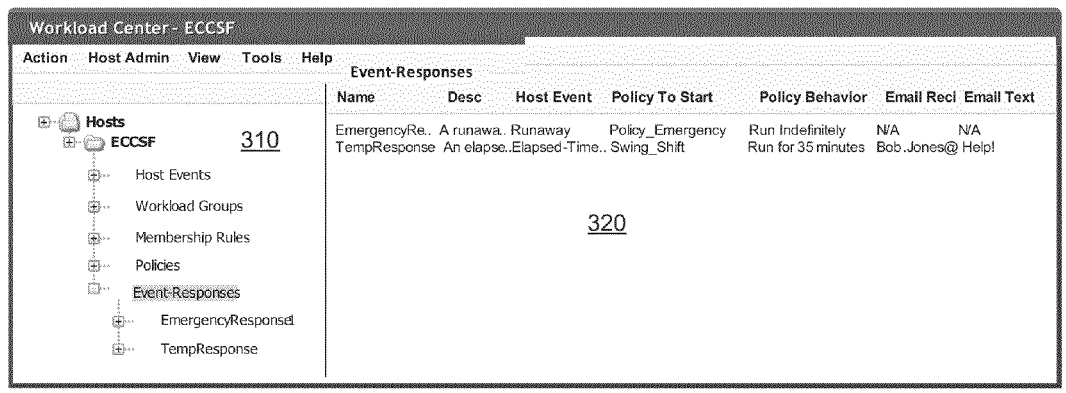
FIG. 3 is an illustration of a screenshot of an exemplary Graphical User Interface (GUI) adapted according to one embodiment.

FIG. 3 is an illustration of a screenshot of an exemplary Graphical User Interface (GUI) 300 adapted according to one embodiment. GUI 300 allows a human operator, e.g., at server 105 or client 115 of FIG. 1, to add, delete, and/or modify a variety of objects and processes, such as host-level events, workload groups, policies, and Event-Responses. Left pane 310 is a tree-type interface that allows a user to select one or more items, e.g., by using a mouse or other device. When the "Event-Responses" node is expanded, a list of user-configured Event-Responses will appear as child elements below it. When the "Event-Responses" node is selected, the summary "Event-Responses" will appear in right pane 320, listing the name of each Event-Response, the Descriptive text, the Host-Event that serves as the trigger, and the action(s) to be performed. In this embodiment, the actions that can be performed include changing the active policy or its behavior, notifying a human recipient, and providing a command input, though other actions are available in other embodiments.

Figure 4:
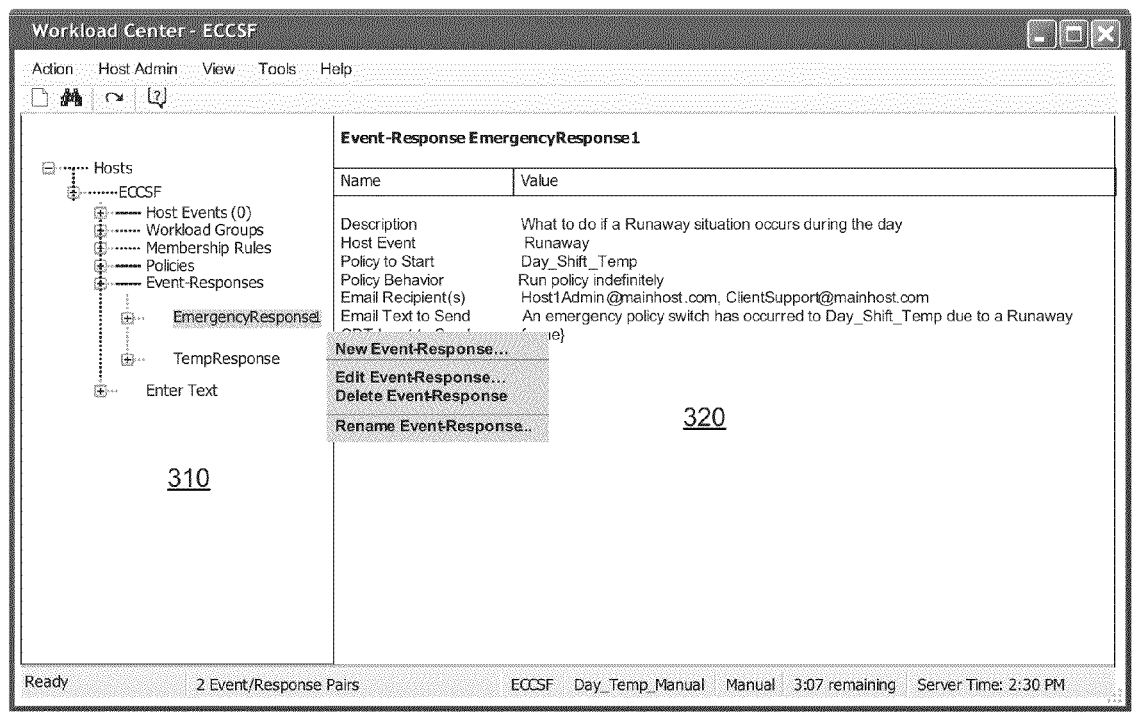
FIG. 4 is an illustration of an exemplary GUI adapted according to one embodiment.

FIG. 4 is an illustration of GUI 300 when a particular Event-Response is selected. selecting the name of a specific Event-Response in the tree-view of left pane 310 causes a menu of the following actions to be displayed: "Edit Event-Response . . . ", "Delete Event-Response", "New Event-Response . . . " and "Rename Event-Response . . . ". Also, selecting the "Event-Responses" element itself displays "New Event-Response . . . " as an action. The same "New" action is displayed when the user right-clicks on the summary "Event-Response <name>" in right pane 320.

Figure 5:
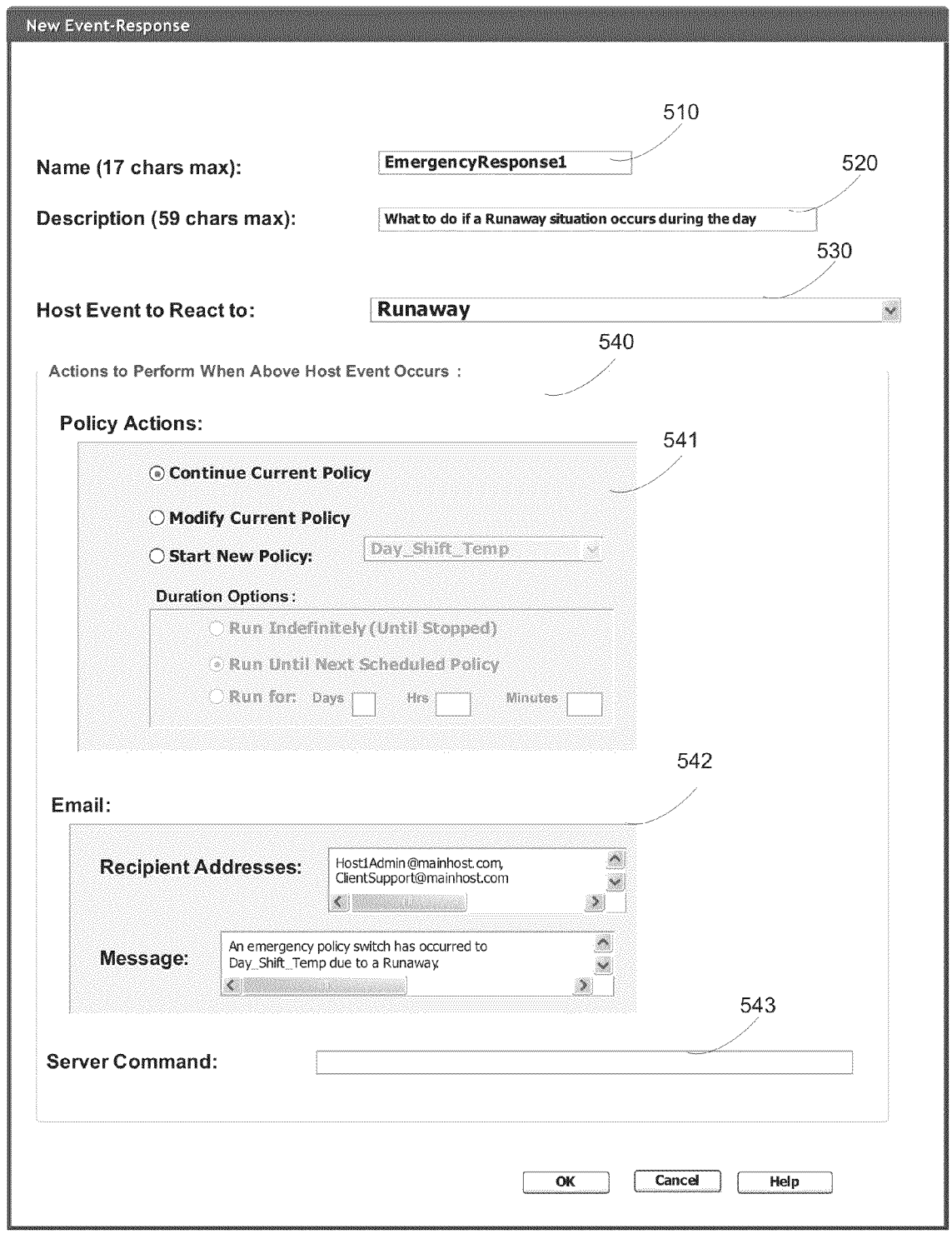
FIG. 5 is an illustration of an exemplary GUI, adapted according to one embodiment.

FIG. 5 is an illustration of exemplary GUI 500, adapted according to one embodiment. GUI 500 is a "New Event-Response" GUI that is displayed when a user selects "New Event-Response . . . " from GUI 300 (FIG. 4).

The "New Event-Response" screen contains multiple fields in which a user can manually enter a new Event-Response, which applies to one or more policies, and may be triggered by detection of one or more pre-defined host-level events. In field 510, a name of the new Event-Response is entered. In field 520, descriptive text can be entered that may explain to a human user the purpose of the new Event-Response. In field 530, there is a drop-down list used to select one host-level event from the currently-defined list for a given host, where a host may be a specific computer system. The workload manager may manage a number of hosts, and each host may have its own individual set of workload groups, policies, and Event-Responses.

Field 540 provides three different selectable actions. Policy Action section 541 allows a user to set one or more policy actions to occur on the detection of a particular host-level event and it includes three choices: Continue Current Policy (the default), Modify Current Policy, and Start New Policy that has a drop-down list in which the currently-defined policies are displayed and from which one may be selected. If the "Modify" or "Start New" selections are made, then an additional set of three choices is enabled: Run Indefinitely, Run Until Next Scheduled Policy, and Run for <days><hours><minutes>.

Email box 542 has an email action section, in which an Email address (or address-list) and the text of a message may be entered. A user can use email box 542 to specify an email to be sent to one or more human users in response to the detection of a given host-level event.

Figure 6:
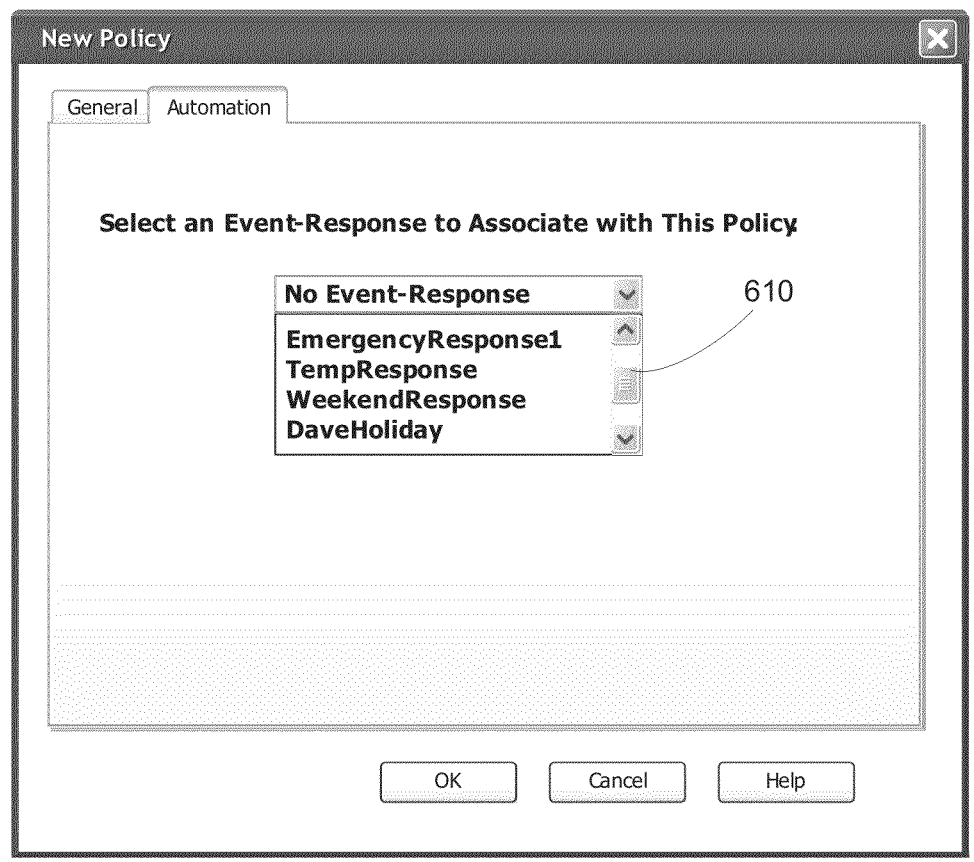
FIG. 6 is an illustration of an exemplary GUI, adapted according to one embodiment.

Server command box 543 includes a field in which a command string may be entered. Upon detection of the specified host-level event, the command string is submitted to the mainframe. A human user may select various combinations of the options in GUI 500 to define a new Event-Response. The association of that Event-Response to a particular policy is shown in FIG. 6 as part of the definition of the policy FIG. 6 is an illustration of exemplary GUI 600, adapted according to one embodiment. GUI 600 is a "New Policy" GUI that can be accessed through the "Policies" entry on the tree view of left screen 310 of GUI 300 (FIG. 4). GUI 600 can be used to configure a new policy (or edit an existing policy), including selecting an Event-Response to associate with a new policy. Furthermore, a particular Event-Response can be associated with more than one policy. GUI 600 is broken into two tabs, where the "Automation" screen is shown in FIG. 6. On the "Automation" tab, there appears drop-down 610 list of user-defined "Event-Responses" for a currently-selected host, if any. The user may select one (or no) Event-Response to associate with a new policy. By default, "No Event-Response" is selected.

Figure 7:
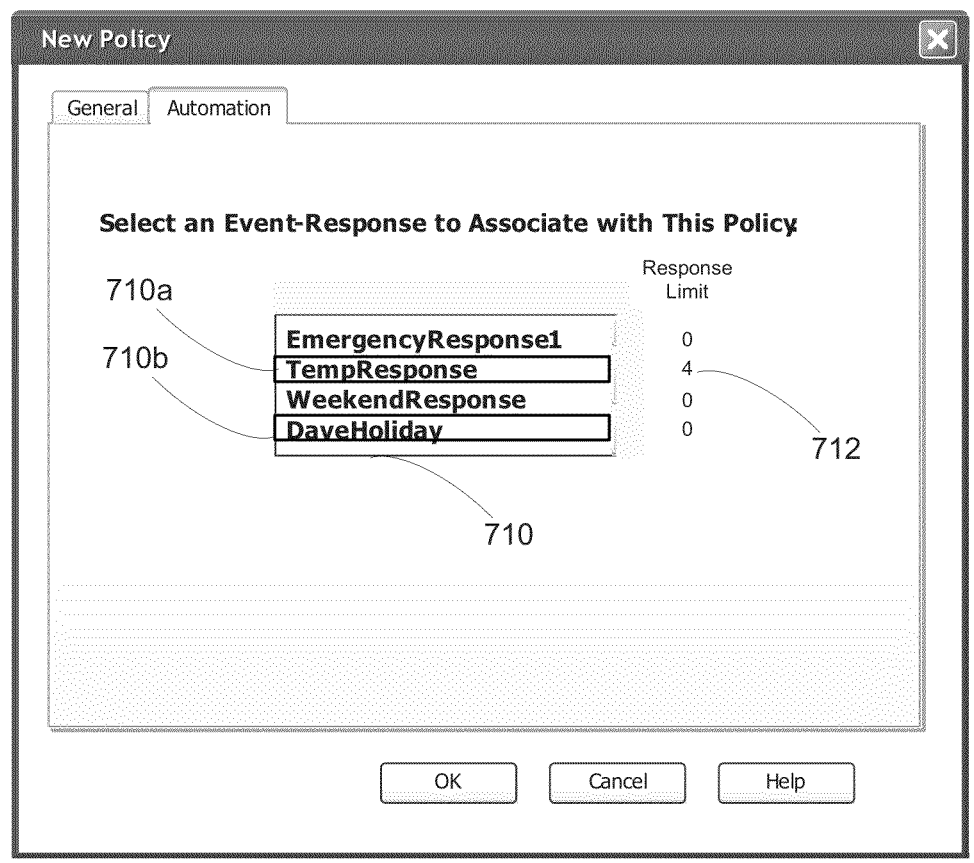
FIG. 7 is an illustration of an exemplary GUI for associating multiple event-responses with a policy according to one embodiment.

The GUI 600 of FIG. 6 may be adjusted in other embodiments to allow association of multiple event-responses with a policy. FIG. 7 is an illustration of an exemplary GUI for associating multiple event-responses with a policy according to one embodiment. GUI 700 includes a selection box 710 listing event responses available for association with a policy. The user may select one or more of the event-responses in the selection box 710. For example, the user may select item 710a and item 710b in the selection box 710.

The GUI 700 may also include input 712 for response limits corresponding to each event-response in selection box 710. The response limits specify a number of permitted executions for an event-response. For example, the user may input "4" as a response limit in input 712 for the event-response "TempResponse." When host events occur causing execution of the "TempResponse" event-response while the policy is active, an integer counter (not shown) corresponding to the "TempResponse" event-response is incremented. When the integer counter exceeds the response limit specified in input 712, the event-response "TempResponse" no longer executes while the policy is active. According to one embodiment when the integer counter for an event-response exceeds the permitted response limit for the event-response, alternate event-response actions may be specified. According to another embodiment when the integer counter for an event-response exceeds the permitted response limit for the event-response, the host event provoking the event-response is logged but no event-response is performed. A default value of zero for the permitted response limit of an event-response may indicate that there is no limit on the number of executions for the event-response.

Figure 8:
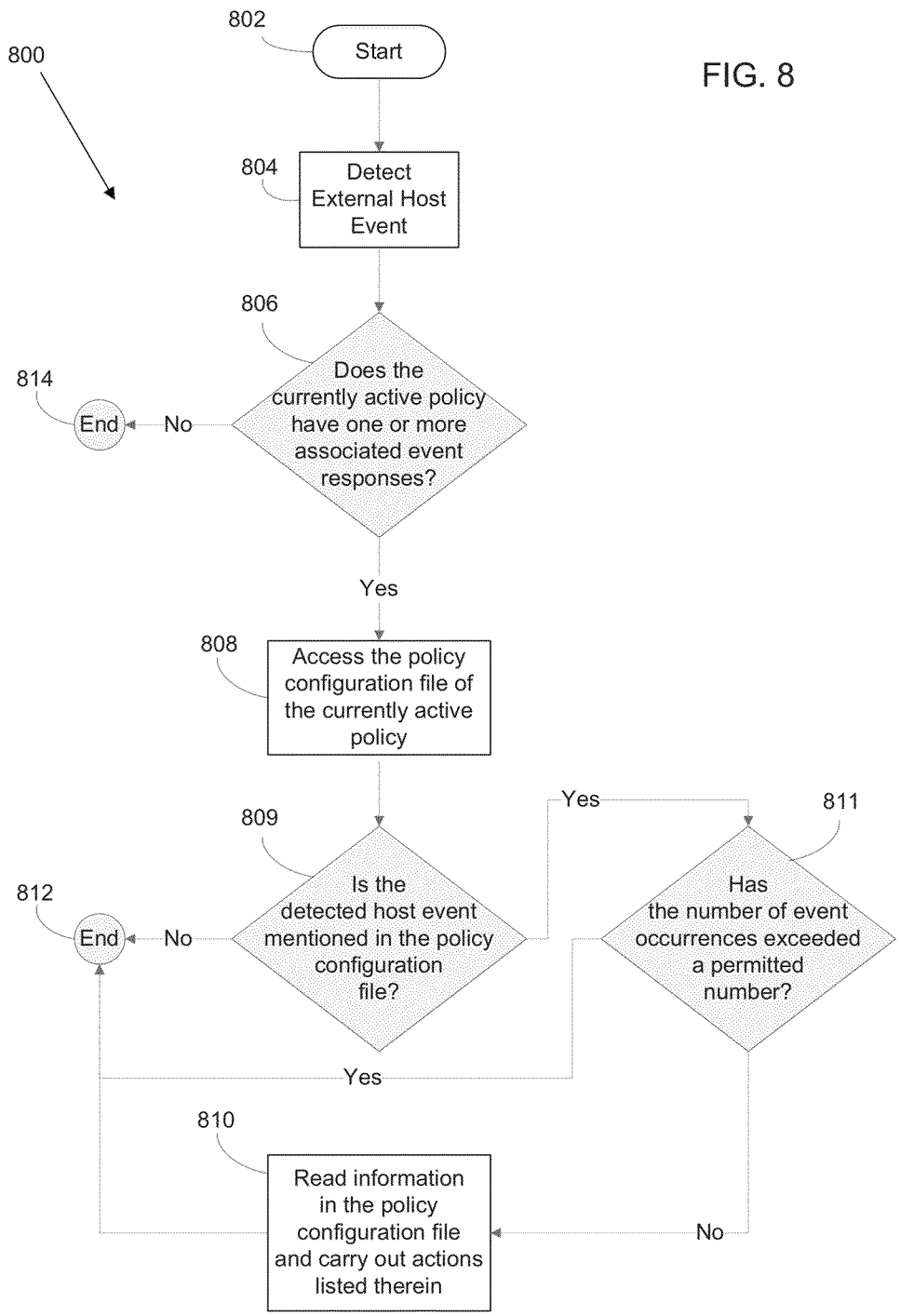
FIG. 8 is an illustration of an exemplary operational flow for executing event-responses a permitted number of times in response to host events according to one embodiment.

After event-responses for policies are configured with GUI 700 the method of FIG. 8 may execute on a computer system to automatically execute certain event-responses based on host events. FIG. 8 is an illustration of an exemplary operational flow for executing event-responses a permitted number of times in response to host events according to one embodiment. Method 800 begins at block 802, and method 800 detects a host event at block 804. At block 806, the system determines whether the active policy has been assigned one or more event-responses. For example, event-responses 710a and 710b may be assigned to a policy with GUI 700 of FIG. 7. When no event-responses are assigned to the policy, method 800 continues to block 814 to terminate. According to one embodiment, the host event is logged before terminating at block 814. When event-responses are assigned to the policy, method 800 continues to block 808.

At block 808, the configuration file for the active policy is accessed to read event-response configurations. The configuration file may be, for example, an extensible markup language (XML) document having tags for each event-response defined for the policy. At block 809, it is determined whether the host event is associated with an event-response in the configuration file. When an event-response is triggered by the host event, method 800 proceeds to block 811. When no event-response is triggered by the host event, method 800 proceeds to terminate at block 812. According to one embodiment, the host event may be logged before terminating at block 812.

At block 811, it is determined whether the event-response triggered by the host event has executed beyond a permitted number of executions. The permitted number may be defined by the user in input 712 of GUI 700 of FIG. 7. The input 712 may be stored in the XML content of the configuration file in an attribute associated the event-response tag. When the permitted number of executions for the event-response is exceeded, method 800 terminates at block 812. According to one embodiment, the host event, the current policy, and/or the triggered event-response may be logged before terminating at block 812.

When the number of executions of the event-response has not exceeded the permitted response number, then method 800 continues to block 810. At block 810, information for the event-response is read from the configuration file and actions associated with the event-response are executed. Method 800 then terminates at block 812. According to one embodiment, the host event, the event-response, the policy, and/or the actions carried out may be logged before terminating at block 812.

The integer counter for an event-response within a policy may be reset automatically in response to events occurring on the host system or may be reset manually by the user. According to one embodiment, the integer counter for event-responses may be reset to zero automatically each time a new policy is activated.

The GUIs shown in FIGS. 3-7 are exemplary of one embodiment, and the various embodiments are not limited to the illustrated examples. It is understood that different GUIs may be used by other embodiments.

Various embodiments may include one or more advantages over conventional systems. For instance, operators of conventional distributed computing systems may find it difficult to handle problems associated with host-level events. Typically, such efforts involve manual troubleshooting and manual entry of policy changes. However, various embodiments described herein allow a human operator to create a new Event-Response entity in a workload manager. The Event-Response entity indicates a host-level event and a set of actions to be performed in response to the host-level event. Among the possible actions is the ability to change the policy for a specified period of time. A single host-level event may be the trigger in several different Event-Responses, with different sets of actions. After definition, an Event-Response can then be associated with any set of policies. Once the associations have been made, if the designated host-level event is seen to occur while an associated policy is active, the workload manager automatically carries out the listed actions, thereby intervening more quickly than can a human operator and also saving efforts of the human operator. Another advantage may include minimizing the need to have 24/7 operators with knowledge of business priorities and authority to make changes affecting business—critical functions on the fly.

It is recognized that the above systems and methods operate using computer hardware and software in any of a variety of configurations. Such configurations can include computing devices, which generally include a processing device, one or more computer readable media, and a communication device. Other embodiments of a computing device are possible as well. For example, a computing device can include a user interface, an operating system, and one or more software applications. Several example computing devices include a personal computer (PC), a laptop computer, or a personal digital assistant (PDA). A computing device can also include one or more servers, one or more mass storage databases, and/or other resources.

A processing device is a device that processes a set of instructions. Several examples of a processing device include a microprocessor, a central processing unit, a microcontroller, a field programmable gate array, and others. Further, processing devices may be of any general variety such as reduced instruction set computing devices, complex instruction set computing devices, or specially designed processing devices such as an application-specific integrated circuit device.

Computer readable media includes volatile memory and non-volatile memory and can be implemented in any method or technology for the storage of information such as computer readable instructions, data structures, program modules, or other data. In certain embodiments, computer readable media is integrated as part of the processing device. In other embodiments, computer readable media is separate from or in addition to that of the processing device. Further, in general, computer readable media can be removable or non-removable. Several examples of computer readable media include, RAM, ROM, EEPROM and other flash memory technologies, CD-ROM, digital versatile disks (DVD) or other optical storage, magnetic cassettes, magnetic tape, magnetic disk storage or other magnetic storage devices, or any other medium that can be used to store desired information and that can be accessed by a computing device. In other embodiments, computer readable media can be configured as a mass storage database that can be used to store a structured collection of data accessible by a computing device.

A communications device establishes a data connection that allows a computing device to communicate with one or more other computing devices via any number of standard or specialized communication interfaces such as, for example, a universal serial bus (USB), 802.11 a/b/g network, radio frequency, infrared, serial, or any other data connection. In general, the communication between one or more computing devices configured with one or more communication devices is accomplished via a network such as any of a number of wireless or hardwired WAN, LAN, SAN, Internet, or other packet-based or port-based communication networks.

The above specification, examples and data provide a complete description of the manufacture and use of the composition of the invention. Since many embodiments of the invention can be made without departing from the spirit and scope of the invention, the invention resides in the claims hereinafter appended.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   detecting a host event;
   identifying an event-response in a current policy corresponding to the detected host event;
   determining a number of times the event-response corresponding to the host event has executed; and
   when the number of executions is less than or equal to a pre-defined value, execute the event-response;
   wherein identifying comprises: determining whether the current policy has one or more associated event-responses; and when one or more event-responses are associated with the current policy, accessing a configuration file for the current policy before detecting the host event;
   when the pre-defined value is equal to zero, execute the event-response.

2. The method of claim 1, further comprising receiving an identification of one or more event-responses for association with the current policy.

3. The method of claim 1, further comprising when the number of executions is greater than the pre-defined value, log information regarding the host event.

4. The method of claim 1, in which the step of executing the event-response comprises changing the active policy to a new policy.

5. The method of claim 1, in which the host event comprises at least one of a software change, a host machine processes change, a resources key change, and a critical failure.

6. A computer program product, comprising:
   a non-transitory computer readable medium comprising:
   code to detect a host event;
   code to identify an event-response in a current policy corresponding to the detected host event;
   code to determine a number of times the event-response corresponding to the host event has executed; and
   code to execute the event-response when the number of executions is less than or equal to a pre-defined value
   wherein identifying comprises: determining whether the current policy has one or more associated event-responses; and when one or more event-responses are associated with the current policy, accessing a configuration file for the current policy before detecting the host event;
   when the pre-defined value is equal to zero, execute the event-response.

7. The computer program product of claim 6, in which the medium further comprises:
   code to determine whether the current policy has one or more associated event-responses;
   and code to access a configuration file for the current policy when one or more event-responses are associated with the current policy.

8. The computer program product of claim 7, in which the medium further comprises code to receive an identification of one or more event-responses for association with the current policy.

9. The computer program product of claim 6, in which the medium further comprises code to log information regarding the host event when the number of executions is greater than the pre-defined value.

10. The computer program product of claim 6, in which the medium further comprises code to change the active policy to a new policy when the event-response executes.

11. The computer program product of claim 6, in which the host event comprises at least one of a software change, a host machine processes change, a resources key change, and a critical failure.

12. The computer program product of claim 6, in which the medium further comprises code to execute the event-response when the pre-defined value is equal to zero.

13. An apparatus, comprising:
    a memory; and
    a processor coupled to the memory, in which the processor is configured:
    to detect a host event;
    to identify an event-response in a current policy corresponding to the detected host event;
    to determine a number of times the event-response corresponding to the host event has executed; and
    to execute the event- response when the number of executions is less than or equal to a pre-defined value;
    wherein identifying comprises: determining whether the current policy has one or more associated event-responses; and when one or more event-responses are associated with the current policy, accessing a configuration file for the current policy before detecting the host event;
    when the pre-defined value is equal to zero, execute the event-response.

14. The apparatus of claim 13, in which the processor is further configured: to determine whether the current policy has one or more associated event-responses; and to access a configuration file for the current policy when one or more event-responses are associated with the current policy.

15. The apparatus of claim 14, in which the processor is further configured to receive an identification of one or more event-responses for association with the current policy.

16. The apparatus of claim 13, in which the processor is further configured to log information to the memory regarding the host event when the number of executions is greater than the pre-defined value.

17. The apparatus of claim 13, in which the processor is further configured to change the active policy to a new policy when the event-response executes.

18. The apparatus of claim 13, in which the host event comprises at least one of a software change, a host machine processes change, a resources key change, and a critical failure.

* * * * *